United States Patent
Nahum et al.

(10) Patent No.: US 10,640,136 B2
(45) Date of Patent: May 5, 2020

(54) MECHANICAL SYSTEM FOR STABILIZATION OF VEHICLES ON CASTORS

(71) Applicant: MedTech S.A., Montpellier (FR)

(72) Inventors: Bertin Nahum, Baillargues (FR); Fernand Badano, Villeurbanne (FR); Lucien Blondel, Montpellier (FR); Eric Roussel, Mas de Londres (FR)

(73) Assignee: MedTech S.A., Montpellier (FR)

(*) Notice: Subject to any disclaimer, the term of this patent is extended or adjusted under 35 U.S.C. 154(b) by 8 days.

(21) Appl. No.: 15/778,919

(22) PCT Filed: Nov. 25, 2016

(86) PCT No.: PCT/EP2016/078768
§ 371 (c)(1),
(2) Date: May 24, 2018

(87) PCT Pub. No.: WO2017/089515
PCT Pub. Date: Jun. 1, 2017

(65) Prior Publication Data
US 2018/0346008 A1    Dec. 6, 2018

(30) Foreign Application Priority Data
Nov. 25, 2015   (FR) ..................... 15 61381

(51) Int. Cl.
*B60B 33/00* (2006.01)
*B62B 5/04* (2006.01)
(Continued)

(52) U.S. Cl.
CPC .......... *B62B 5/049* (2013.01); *B60B 33/0005* (2013.01); *B60B 33/0049* (2013.01);
(Continued)

(58) Field of Classification Search
CPC . B60B 33/0005; B60B 33/0049; B60B 33/06; B60B 33/0089; B60P 1/52; B62B 5/049; B62B 5/0433
(Continued)

(56) References Cited

U.S. PATENT DOCUMENTS 2,262,288 A * 11/1941 Klipstein .............. D06F 39/125
                                                                                          188/152
4,020,959 A     5/1977 Livesay
(Continued)

FOREIGN PATENT DOCUMENTS

CN          108290596       7/2018
FR          937594 A        8/1948
(Continued)

OTHER PUBLICATIONS

"International Application Serial No. PCT/EP2016/078768, International Search Report dated Feb. 10, 2017", 6 pgs.
(Continued)

*Primary Examiner* — Thomas W Irvin
(74) *Attorney, Agent, or Firm* — Schwegman Lundberg & Woessner, P.A.

(57) ABSTRACT

The present invention relates to a mechanical system for stabilization on the floor for vehicles on castors (for example a surgical assistance robot used in an operating room) that can adopt two stable states, i.e. disengaged, the vehicle resting on the castors, and activated, the vehicle being immobilized on the floor, respectively. According to the invention, the stabilization system comprises:
  feet for resting on the floor, movable between a first retracted position, at a distance from the floor, and a contact position ensuring the immobilization of the vehicle through mechanical friction against the floor;
(Continued)

means for mechanically controlling said supporting feet, said control means being movable between two stable positions corresponding to the activated and disengaged states;

mechanical means for transmitting the displacement of the control means simultaneously to all the supporting feet.

15 Claims, 4 Drawing Sheets

(51) Int. Cl.
  *B60B 33/06* (2006.01)
  *B60P 1/52* (2006.01)
(52) U.S. Cl.
  CPC ............ *B62B 5/0433* (2013.01); *B60B 33/06* (2013.01); *B60P 1/52* (2013.01)
(58) Field of Classification Search
  USPC .................................................... 188/1.12, 5
  See application file for complete search history.

(56) References Cited

U.S. PATENT DOCUMENTS

| | | | | |
|---|---|---|---|---|
| 4,886,286 | A * | 12/1989 | Whorton, III | B62B 3/006 280/47.35 |
| 5,205,381 | A * | 4/1993 | Mehmen | B62B 5/04 188/1.12 |
| 6,264,006 | B1 * | 7/2001 | Hanson | A61G 7/012 188/1.12 |
| 7,950,501 | B2 * | 5/2011 | Takahashi | A45C 5/145 188/5 |
| 8,006,985 | B2 * | 8/2011 | Facey | B60T 1/14 280/43.14 |
| 8,191,909 | B2 * | 6/2012 | Livengood | A61H 3/04 188/19 |
| 8,888,110 | B2 * | 11/2014 | Sadeh | B62B 5/049 280/30 |
| 8,910,953 | B2 * | 12/2014 | Faulhaber | B62B 5/04 16/35 R |
| 9,074,648 | B2 * | 7/2015 | Spoor | B60T 11/046 |
| 9,579,241 | B2 * | 2/2017 | Spoor | B62B 9/082 |
| 2007/0080030 | A1 * | 4/2007 | Kramer | B60T 1/14 188/5 |
| 2008/0136133 | A1 * | 6/2008 | Takahashi | A45C 5/145 280/79.2 |
| 2010/0187782 | A1 * | 7/2010 | Facey | B60T 1/14 280/30 |
| 2011/0101636 | A1 * | 5/2011 | Faulhaber | B62B 5/04 280/47.34 |
| 2013/0119623 | A1 | 5/2013 | Sadeh et al. | |
| 2015/0100066 | A1 | 4/2015 | Kostrzewski et al. | |
| 2015/0272795 | A1 * | 10/2015 | Spoor | B60T 11/046 280/47.4 |

FOREIGN PATENT DOCUMENTS

| | | | |
|---|---|---|---|
| FR | 2221933 | A5 | 10/1974 |
| FR | 3043970 | | 5/2017 |
| GB | 615297 | A | 1/1949 |
| JP | S5043470 | U | 12/1975 |
| JP | S55178457 | U | 12/1980 |
| JP | 2019503919 | A | 2/2019 |
| WO | WO-2017066106 | A1 | 4/2017 |
| WO | WO-2017089515 | A1 | 6/2017 |

OTHER PUBLICATIONS

"International Application Serial No. PCT/EP2016/078768, Written Opinion dated Feb. 10, 2017", 6 pgs.

"Australian Application Serial No. 2016359906, First Examination Report dated Dec. 6, 2018", 2 pgs.

"Canadian Application Serial No. 3,005,282, Examiner's Rule 30(2) Requisition dated Jun. 12, 2019", 4 pgs.

"European Application Serial No. 16801762.2, Response filed Feb. 6, 2019 to Communication pursuant to Rules 161(2) amd 162 EPC dated Jul. 27, 2018", 11 pgs.

"Japanese Application Serial No. 2018-526938, Notification of Reasons for Rejection dated May 7, 2019", w/ English Translation, 8 pgs.

"Japanese Application Serial No. 2018-526938, Response filed Jul. 30, 2019 to Notification of Reasons for Rejection dated May 7, 2019", w/ English claims, 19 pgs.

\* cited by examiner

MECHANICAL SYSTEM FOR STABILIZATION OF VEHICLES ON CASTORS

This application is a U.S. National Stage Application under 35 U.S.C. 371 from International Application Serial No. PCT/EP2016/078768, filed on 25 Nov. 2016, and published as WO 2017/089515 A1 on 1 Jun. 2017, which claims priority to French Application No. 1561381, filed on 25 Nov. 2015, the benefit of priority of each of which is claimed hereby, and each of which are incorporated by reference herein in its entirety.

The present invention is related to the field of the equipment of vehicles on castors and in particular for their stabilization on the floor.

The present invention will find a more particular application in the stabilization of a medical device on castors such as for example a surgical assistance robot on castors.

The quality of the stabilization on the floor is a key factor in the use of such a device for assisting a surgical procedure. This stabilization permits to block the device relative to the anatomy of the patient when the latter is localized, and has a direct impact on the accuracy of the actions performed by the surgeon, who is sure of the immobility of the device relative to said anatomy.

Known are at least five mechanical systems used for the stabilization on the floor of devices on castors.

A first system for stabilizing a device on castors consists in directly locking each castor of the device by means of an independent mechanical brake arranged on each castor. This first system is commonly used to equip devices on castors such as an instant trolley, a medical bed, etc. This first system has several drawbacks, the most critical one of which is the obligation to actuate the brake independently for each one of the castors. In addition, this stabilization system does not permit to compensate for defects of flatness of the floor, which results into an instability that can be problematic when the device is used for a handling that requires accuracy, such as for example a surgical operation.

A second system for stabilizing a rolling device is designed to equip vehicle frames having a body sill capable of resting on the floor, including castors equipped with electric or hydraulic jacks permitting to retract them and to immobilize the device on castors by placing the body sill on the floor. Such a system, for example as described in US2015/0109966 A1, has the drawbacks of being dependent on an electric power supply and of raising conventional problems of maintenance and fragility for this type of design. For example, an impact at the level of a castor is likely, depending on its intensity, to damage the jack associated with it. In addition, the body sill leaves a too small space (less than 35 mm) between the floor and the device on castors, which can compromise its displacement when it encounters obstacles such as cables running on the floor. Moreover, this stabilization system does not compensate for a significant lack of flatness of the floor.

A third system for stabilizing a device on castors, developed by the applicant, comprises a vehicle frame equipped with feet, each associated with a hydraulic jack. When the feet are extended, they rest on the floor, compensate for at least part of the weight of the device exerted onto the castors and stabilize the medical device. The complexity of the mechanism actuating the feet associated with a jack also results into a dependence on an electric power supply, and generally induces the same drawbacks as in the preceding solution. It should be noted that, since the feet are not completely retractable, they are exposed to the shocks during the displacements of the rolling device, and may also hinder the displacement of the medical device because of their bulky size. Moreover, once they are extended, the feet do not permit to compensate for a lack of flatness of the floor, in particular when it is important.

A fourth system comprises a frame equipped with feet, each of them associated with a mechanical jack. When they are extended, the feet rest on the floor and compensate at least in part for the weight exerted onto the castors. This mechanical jack system has a considerable bulky size under the frame, which can also compromise the displacement of the medical device when it encounters obstacles. Moreover, this system does not provide any compensation for the mechanical play and has not enough flexibility to compensate for the defects in flatness of the floor.

A fifth existing stabilization system is based on feet that are mechanically independent and extendable through the actuation of a pedal via a transmission system comprising a cam. When the pedal is actuated, the foot associated with it extends, and when all the feet are extended, they partially compensate for the weight exerted onto the castors and thus stabilize the device. This stabilization system has the drawbacks of not compensating for the mechanical plays in the transmission system that extends the feet, and it obliges an operator to independently actuate each foot. Finally, it is hardly effective for compensating for a lack of flatness of the floor.

Further mechanical systems for stabilization on the floor for a vehicle on castors exist in other technical fields such as that of the pram, some of which are described for example in GB 615 297, FR 2 221 933 and FR 937 594.

The present invention copes with the afore-mentioned problems and aims to provide a mechanically robust system for stabilizing a device on castors, permitting a reliable and easily actuatable immobilization, permitting as good as possible the positioning of the device, for example relative to a patient within the framework of surgical operation.

The stabilization system according to the invention is advantageous in that it permits to limit the bulky size under the medical device, facilitating its mobility, to compensate for a lack of flatness of the floor by maintaining all the supporting feet permanently into contact with the floor, and to reduce the complexity and cost of maintenance. To this end, the mechanical system for stabilization on the floor for vehicles on castors of the present invention, which can adopt two stable states, i.e. disengaged, the vehicle resting on the castors, and activated, the vehicle being immobilized on the floor, respectively, comprises:
  feet for resting on the floor, movable between a first retracted position, at a distance from the floor, and a contact position ensuring the immobilization of the vehicle through mechanical friction against the floor;
  means for mechanically controlling said supporting feet, said control means being movable between two stable positions corresponding to the activated and disengaged states;
  mechanical means for transmitting the displacement of the control means simultaneously to all the supporting feet.

More particularly, the system for stabilization on the floor according to the invention is characterized in that the supporting feet are arranged between the castors, each supporting foot having a structure that includes a connecting part connected to the mechanical transmission means and a supporting part into contact with the floor, said parts being pivotally mounted and provided with elastic restoring means intercalated between them.

The use of exclusively mechanical means permitting to activate the system for stabilization on the floor permits to omit an electric power supply and to eliminate any problem related to the maintenance and the fragility of a stabilization system dependent on an external energy, while ensuring a reliable immobilization of the rolling vehicle through friction of the feet against the floor, resulting in relieving the castors from the fraction of the weight of the vehicle they support.

In addition, the specific structure of each supporting foot is now such that it ensures, when the stabilization system is in the activated state, that each supporting foot is into contact with the floor, irrespective of the state of the latter, namely in the case of the existence of reliefs or unevennesses. Indeed, the elastic restoring means intercalated between the connecting and supporting parts of each supporting foot permit to compensate for any lack of flatness of the floor at the level of each supporting foot. Advantageously, this feature permits a reliable immobilization on the floor of the rolling vehicle, even when the floor has defects, the supporting feet adapting their extension in the event of raising or lowering of the floor.

In the case the mechanical stabilization system of the invention is mounted on the frame of a surgical assistance robot, this reliable immobilization in all circumstances contributes to the accuracy of the surgical procedure.

According to a peculiarity of the invention, when the mechanical system for stabilization on the floor is activated, each supporting foot exerts onto the floor an inclined action the horizontal component of which is in the direction opposite to that of at least one other supporting foot, said horizontal component being oriented in the direction of the castor closest to each supporting foot. The mechanical system being implemented is thus structurally balanced for its function of maintaining stable the mobile device, especially since said horizontal component is preferably oriented towards at least another supporting foot. Moreover, according to a possible configuration, the contact surfaces on the floor of the supporting feet are elongated, tending towards linearity and are oriented in the same direction.

According to a feature of the invention, the control means consist of a pedal rotatable relative to the frame of the vehicle, actuating in rotation an axle equipped with cams each connected to a linkage actuating at least one supporting foot. In order to guarantee a better mechanical safety, the axle actuated by the pedal is preferably equipped with two cams arranged on both sides of the pedal, each linkage controlling the movement of two supporting feet.

According to a possible configuration, the linkage includes a mechanical self-locking system for the pedal in the locked and unlocked position. Advantageously, this mechanical self-locking system for the pedal permits to facilitate the force for locking and unlocking the pedal and thus to prevent the pedal from adopting an intermediate position.

In this perspective, each cam actuates a connecting rod the distal end of the cam of which causes to rotate a pivoting bracket with respect to the frame of the vehicle at the level of the intersection of its two legs and arranged to tilt a supporting foot.

In practice, when the pedal is close to the position corresponding to the activated state, the vertical component of the force exerted by the connecting rod on the cam changes direction, urging the pedal to a locked position. Conversely, when the pedal is close to the position corresponding to the disengaged state, a jack connected to the first leg of at least one bracket exerts a force urging the pedal towards this position, amplifying the force towards the disengaged stable position.

More precisely, the connecting rod is connected in rotation to a first leg of the bracket, the supporting foot being connected to the other leg. The use of a connecting rod connecting, on the one hand, the cam mounted on the axle of rotation of the pedal and, on the other hand, the pivoting bracket relative to the frame of the vehicle permits to actuate a supporting foot by converting the rotary movement of the pedal into a translational movement of the connecting rod, which in turn actuates the supporting feet via an adapted linkage.

Thus, according to an adapted configuration, a linkage rod is hinged to the first leg of the bracket, the other end of said linkage rod being connected to a supporting foot, which it tilts when the bracket rotates. This feature permits the linkage to actuate, via the linkage rod, a supporting foot, which is at a distance from the bracket. And thus to simultaneously actuate at least two supporting feet connected to the same linkage.

According to an additional feature, the linkage rod comprises two adjustable segments via at least one thread permitting to adjust the transmission of the movement of the pedal to the supporting feet by modulating the length of said linkage rod.

Advantageously, the supporting foot according to the invention is comprised of an angle transmission part connected to the bracket or to the linkage rod and of a stirrup-shaped part the free end of which is provided with a shoe for resting on the floor, said parts being freely rotatable about an axle of pivoting in bearings connected to the frame of the vehicle, the angle transmission part driving the stirrup-shaped part when it moves, elastic restoring means connecting said parts mechanically. Preferably, said elastic means are comprised of a stack of spring blades.

Mechanically connecting the angle transmission part and the stirrup-shaped part by elastic means provides flexibility permitting to reliably stabilize the vehicle on a floor having a flatness defect, the supporting feet adapting their extension depending on any unevenness of the floor, for example a raising or lowering. Indeed, the extension of the stirrup-shaped part is forced, on the one hand, mechanically by the tilting of the angle transmission part and, on the other hand, elastically by the force potentially resulting from the elastic means that connect the two parts together.

Further features and advantages of the present invention will become clear from the detailed description of a non-restrictive exemplary embodiment of the invention, illustrated in the attached figures.

Figure 1:
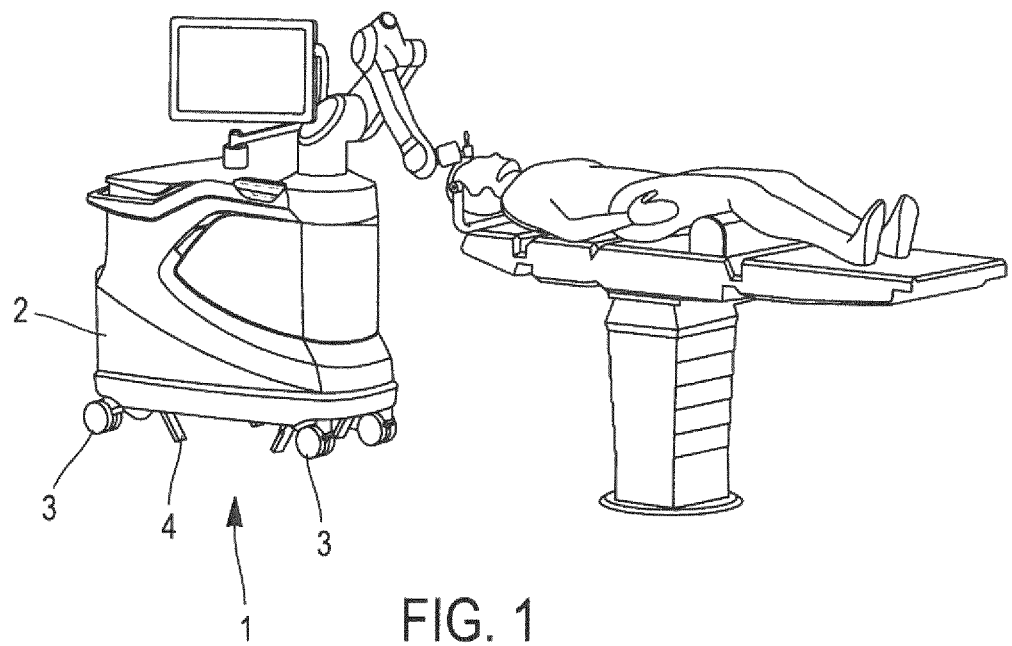
FIG. 1 is a perspective view of a stabilization system mounted under the frame of a vehicle, in this case a surgical assistance robot used in the operating room, the mechanical stabilization system including supporting feet in contact position.

The system for stabilization on the floor (1) of the invention is used with vehicles on castors (2), for example medical and/or surgical assistance robots such as the one illustrated in FIG. 1. The mechanism for blocking the vehicle (2) comprises feet (4), which rest frictionally against the floor and are arranged and oriented relative to each other so as to prevent any displacement of the cart (2) supporting the surgical assistance robot.

Figure 2:
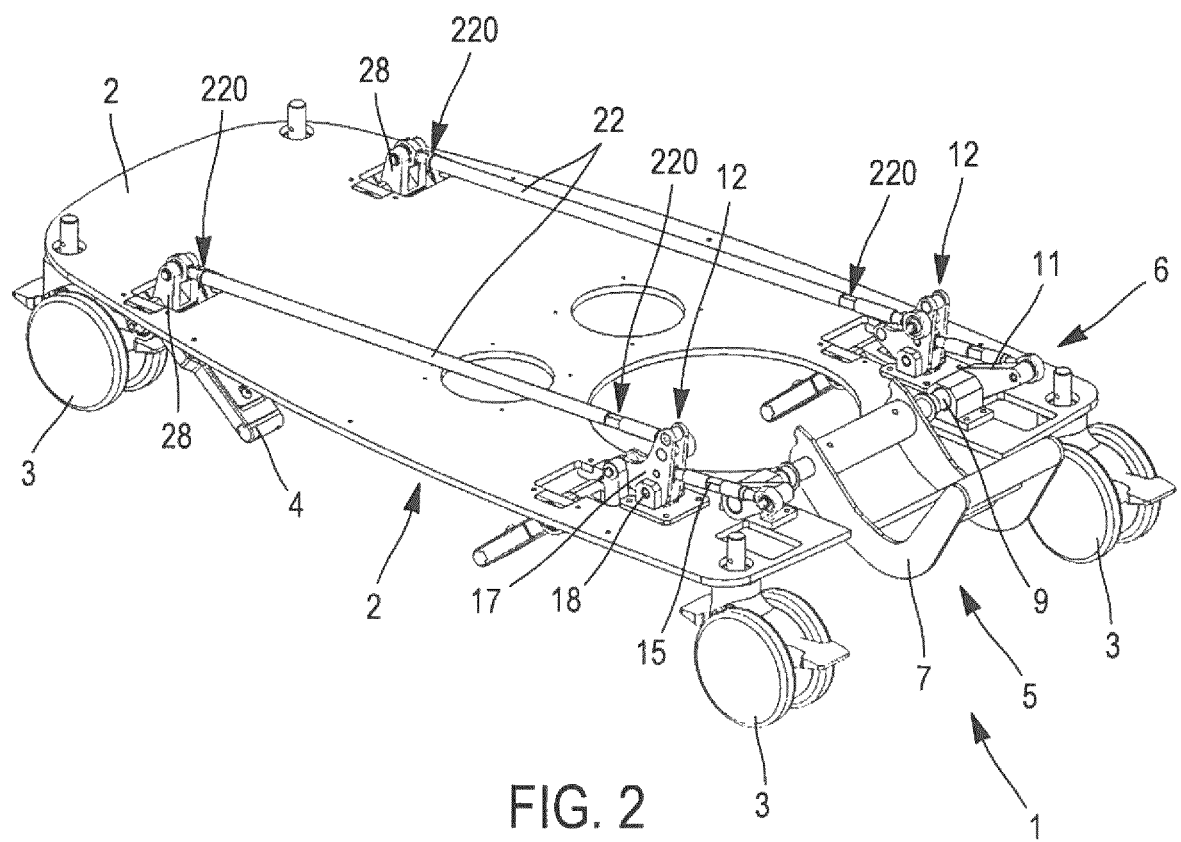
FIG. 2 is a perspective view of the stabilization system mounted on the frame of the vehicle, the supporting feet being in the contact position.

As illustrated more in detail in FIG. 2, where it is isolated, this mechanical system for stabilization (1) on the floor is designed to adopt two stable states: a first disengaged state, in which the vehicle (2) rests on the castors (3), and a second activated state, in which the vehicle (2) is immobilized on the floor.

To this end, the mechanical system for stabilizing (1) on the floor comprises feet (4) for resting on the floor, at least three and preferably four supporting feet (4), which have the characteristic of being movable between two stable positions. A first retracted position, in which they are at a distance from the floor, the device then resting on its castors, and a second extended contact position, in which the supporting feet (4) rest on the floor, making the castors (3) inactive. The immobilization of the vehicle (2) is ensured by a thrust force exerted by each supporting foot (4) against the floor, which comprises a vertical component at least partially canceling the fraction of the weight of the vehicle (2) that is exerted on each castor (3), and a horizontal component, which blocks its displacement by balancing with the horizontal component in a direction opposite to at least another supporting foot (4). This thrust force thus effectively immobilizes the vehicle (2) through mechanical friction by relieving part of the weight that is exerted onto the castors (3) of the vehicle (2). The particular design of the supporting feet (4), which will be explained more in detail hereinafter, permits an adjustable relieving of the load exerted onto the castors (3).

In order to manage the disengaged and activated states of the vehicle (2), the mechanical stabilization system (1) according to the invention provides for equipping the vehicle (2) with mechanical control means (5) permitting to control the retracted or contact position of said supporting feet (4). Said control means (5) are designed movable between two stable positions corresponding to the activated and disengaged states of the vehicle (2).

As illustrated in FIGS. 2 to 6, the mechanical stabilization system (1) is equipped with mechanical means (6) for transmitting the displacement of the control means (5) simultaneously to all the supporting feet (4). According to the example being described, the control means (5) consist of a pedal (7) rotatable relative to the frame (8) of the vehicle (2).

Figure 5:
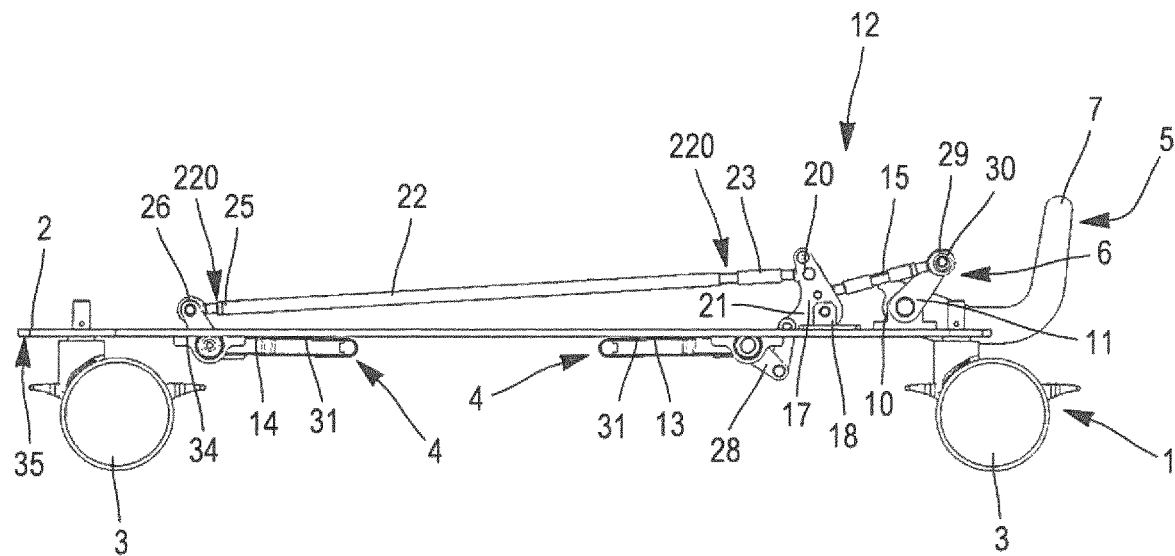
FIG. 5 is a side view of the stabilization system mounted on the frame of the vehicle, the supporting feet being in the retracted position.
Figure 6:
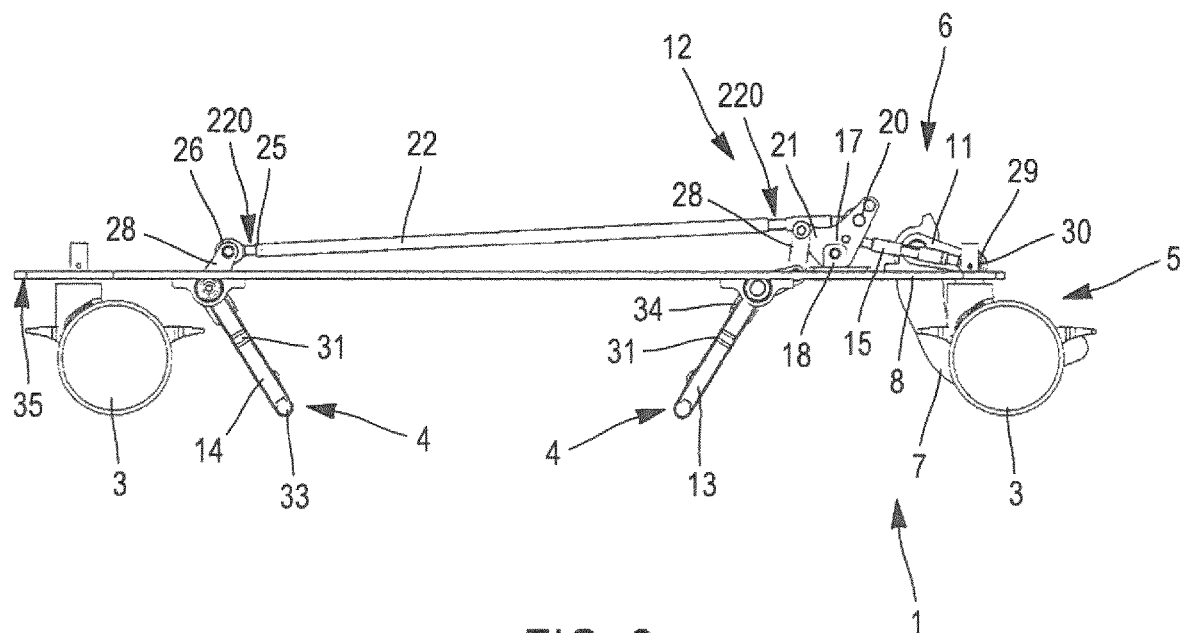
FIG. 6 is a side view of the stabilization system mounted on the frame of the vehicle, the supporting feet being in the contact position.

As shown in FIGS. 2, 5 and 6, the pedal (7) is mounted on a shaft (9) fixed to the frame (8) of the vehicle (2) by means of bearings (10) arranged on both sides of the pedal (7). A cam (11) is connected, on the one hand, to the axle (9) of the pedal (7) and, on the other hand, generally to a linkage (12) adapted to actuate the supporting feet (4). Thus, the pedal (7) permits to actuate the axle (9) of the pedal (7), which, via the cam (11), urges the whole of the linkage (12) actuating in turn the supporting feet (4).

Figure 3:
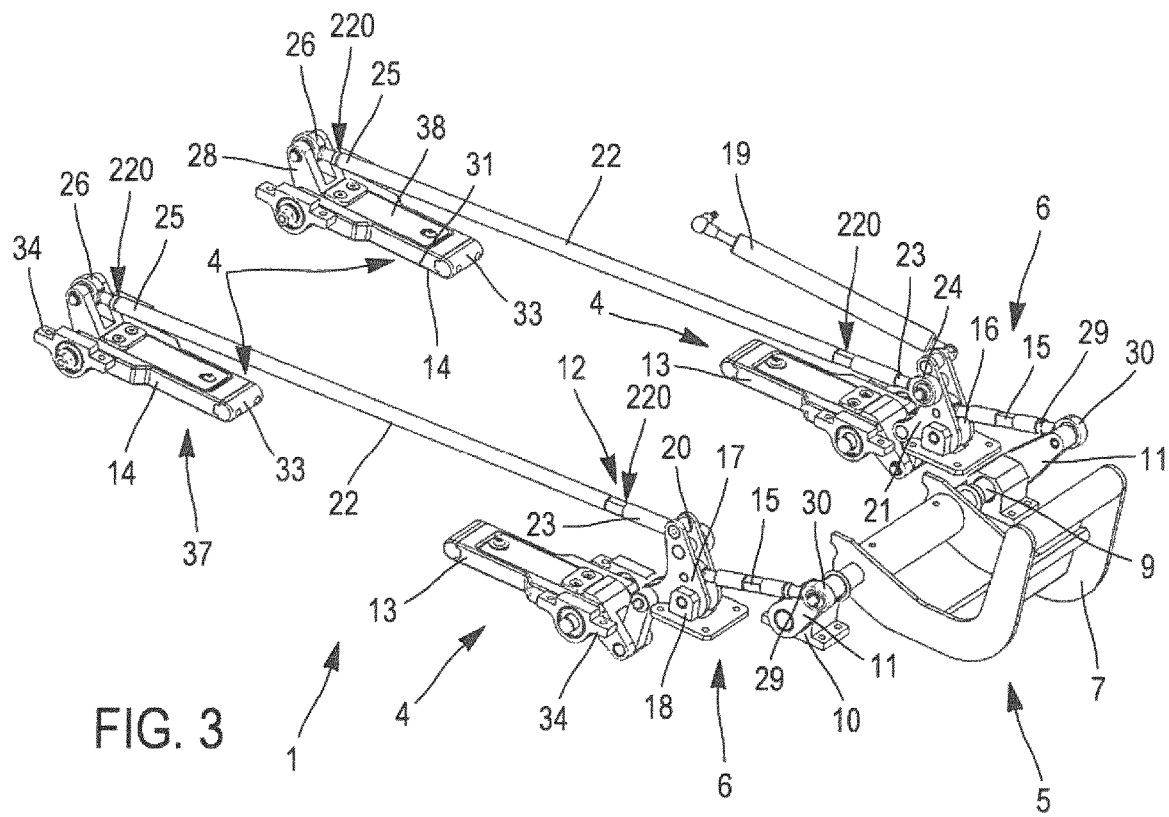
FIG. 3 shows a perspective view of the mechanical system for stabilization on the floor according to the invention, the supporting feet of which are in the retracted position.
Figure 4:
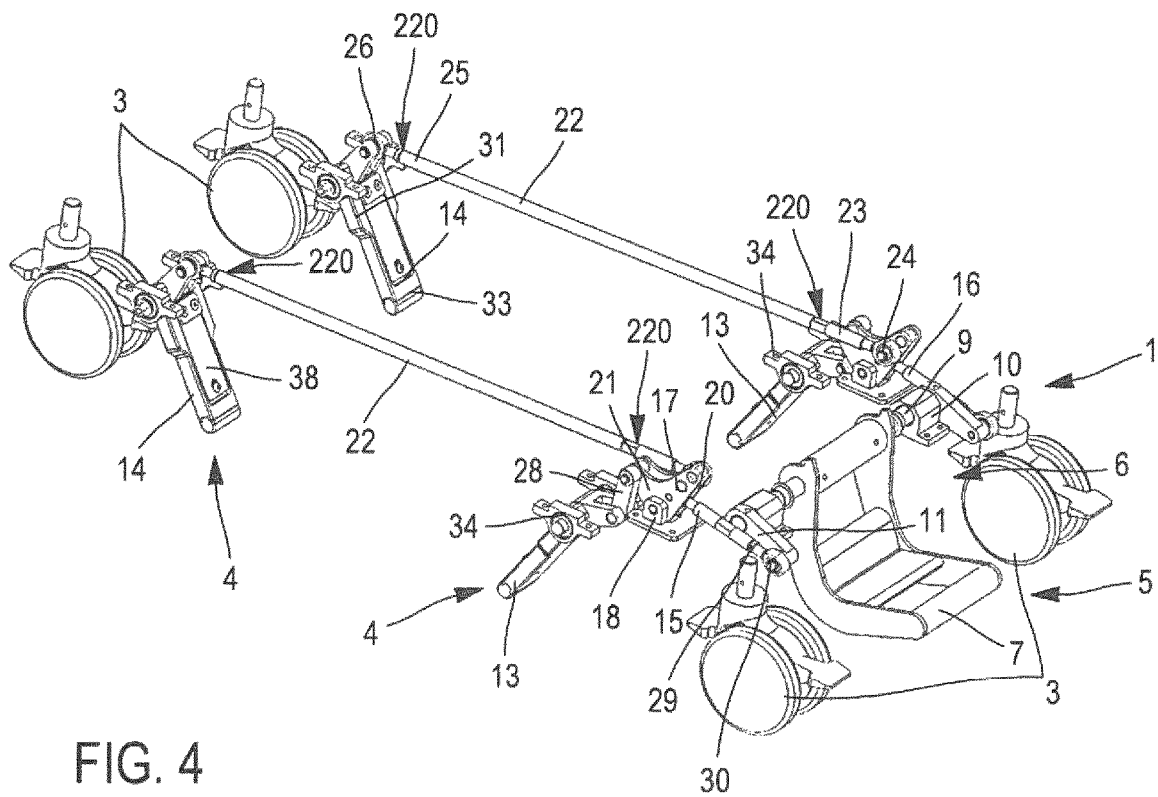
FIG. 4 illustrates in a perspective view the stabilization system, showing the disengaged position of the castors with the supporting feet in the position of contact with the floor.

Preferably and as illustrated in FIGS. 2 to 4, for a better mechanical safety, the axle (9) of the pedal (7) is equipped with two cams (11) arranged on both sides of the pedal (7), each cam (11) being connected to a linkage (12) controlling the movement of two supporting feet (4), a proximal supporting foot (13) of the pedal and a distal supporting foot (14) of the latter.

According to the invention, the mechanical system for stabilizing (1) the vehicle (2) passes from the disengaged state into the activated state by lowering the pedal (7) to a locked position. Conversely, in order to cause the mechanical system for stabilizing (1) the vehicle (2) to pass from the activated state into the disengaged state, an upward thrust must be exerted onto the pedal (7) in order cause it to leave its locked position and to bring it back into an unlocked position. Advantageously, the pedal (7) can be operated with the foot.

According to the invention and in general, the mechanical system for stabilizing (1) the vehicle on castors (2) permits to actuate the supporting feet (4) by transforming the rotational movement of the pedal (7) into a translational movement of the linkages (12) actuating in turn the supporting feet (4) so as to cause them to pass from a retracted position into a contact position and vice versa from a contact position into a retracted position.

More particularly, as illustrated in FIGS. 2 to 6, the linkage (12) is adapted to simultaneously actuate a proximal supporting foot (13) and a distal supporting foot (14) by causing them to rotate.

To this end, the linkage (12) comprises a connecting rod (15), which is actuated by the can (11) connected to the axle (9) of the pedal (7). The connecting rod (15) includes a distal end (16) of the cam, which actuates in rotation a bracket (17) mounted so as to freely rotate at the level of the intersection of its two legs on a rotary axle on a bearing (18) fixed to the frame (8) of the vehicle (2).

According to a peculiarity of the invention illustrated in FIGS. 2, 3, 5 and 6, the mechanical stabilization system (1) comprises a mechanical self-locking system. Thus, when the mechanical stabilization system (1) is in the disengaged state, the vertical component of the force exerted by the connecting rod (15) onto the cam (11) is oriented upwards (illustrated in FIGS. 3 and 5). When the mechanical stabilization system (1) passes from the disengaged state into the activated state, when the pedal (7) arrives close to the activated position, the vertical component of the force exerted by the connecting rod (15) onto the cam (11) changes its direction, urging the pedal (7) towards a locked position (illustrated in FIGS. 2 and 6).

This feature permits to maintain the mechanical stabilization system (1) stable in an activated state. In addition, in order to facilitate the restoring of the pedal (7) into the unlocked state, when the position of the pedal (7) returns close to the position corresponding to the disengaged state, a jack (19) connected to the first leg (20) of at least one bracket (17) exerts a force urging the pedal (7) towards this position. Advantageously, the jack (19) facilitates the force for restoring into the disengaged state and permits to avoid any unstable intermediate positions, which the pedal (7) and the mechanical stabilization system (1) it actuates could adopt (illustrated in FIG. 3).

Advantageously and as illustrated in FIGS. 2 to 6, said bracket (17) is arranged so as to simultaneously cause the distal support foot (14) and the proximal support foot (13) to tilt. To this end, the connecting rod (15) is rotationally connected to the leg (20) of the bracket (17), the proximal supporting foot (14) being connected to the other leg (21), the tilting of the bracket (17) causing the tilting of the proximal supporting foot (13). In order to simultaneously communicate the tilting of the bracket (17) to the distal supporting foot (14), the linkage (12) is equipped with a linkage rod (22) a first end (23) of which is hinged through a pivot connection (24) to the first leg (20) of the bracket (17), the other end (25) of said linkage rod (22) being connected to the distal supporting foot (14) by means of a second pivot connection (26) including an axle (27) integral with an angle transmission part (28) that is in turn connected to the distal supporting foot (14) (illustrated in FIG. 8).

Said linkage rod (22) includes two segments (220) adjustable via at least one thread permitting the fine adjustment of the transmission of the movement of the pedal (7) to the supporting feet (4) by modulating the length of said linkage rod (22). In the present example, each segment is arranged at the level of each end (23, 25) of the linkage rod (22). This feature secondarily permits to adjust the amplitude of rotation of the supporting feet (4) and therefore to adjust the position of the supporting feet (4). To this end, a segment (220) of the linkage rod (22) is equipped with a right-hand thread and the other segment (220) with a left-hand thread. Thus, when the length of said linkage rod (22) is increased, the amplitude of rotation of the supporting feet (4) decreases, conversely, when the length of said linkage rod (22) is shortened, the amplitude of rotation of the supporting feet (4) is increased.

In a similar configuration, the distal end (16) of the connecting rod (15) includes a pivot connection mounted on a rigid axle of the first leg (20) of the bracket (17). The connecting rod (15) comprises a proximal end (29) of the cam (11) to which it is connected through another pivot connection (30) mounted on an axle integral with the cam (11). Each of these end connections of the connecting rod (15) is also equipped with a thread so as to adjust its length, under the same conditions as above, with a right-hand thread on one side and a left-hand thread on the other side. When the length of the connecting rod (15) is shortened by screwing, the force exerted by the connecting rod (15) onto the bracket (17) increases and when the mechanical stabilization system (1) passes into an activated state, the tilting of the bracket (17) is more important and, in fact, the amplitude of rotation of the supporting feet (4) is increased.

In brief, the combination of said threads arranged on the connecting rod (15) and on the linkage rod (22) permit to adjust the position of the supporting feet (4) even more finely and to improve the conditions of their operation.

Figure 7:
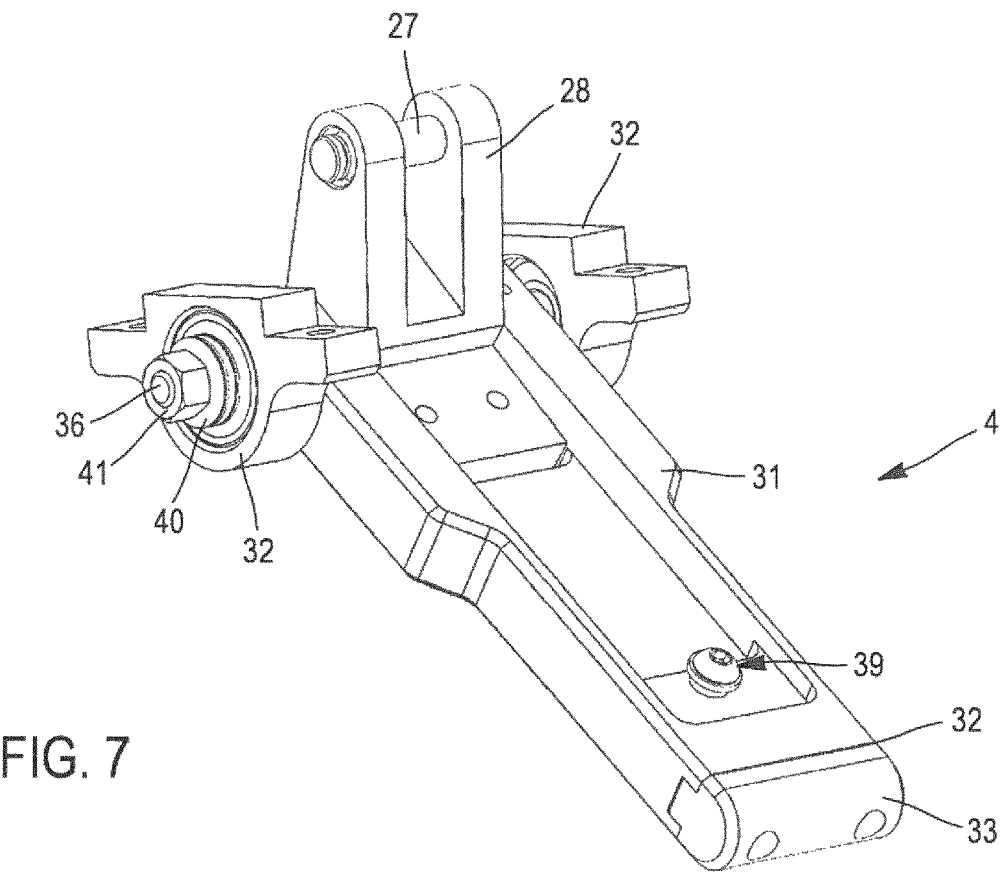
FIG. 7 shows a perspective view of an isolated supporting foot.

As illustrated in FIG. 7, a supporting foot (4) includes a so-called angle transmission part (28) corresponding to a connecting part connecting each supporting foot (4) to the mechanical transmission means (6). To this end, in the case of a distal supporting foot (14) the angle transmission part (28) is hinged to the linkage rod (22) or to the bracket (17) in the case of a proximal supporting foot (13). The supporting foot (4) also comprises a stirrup-shaped part (31) acting as a supporting part, and the free end (32) of which is provided with a shoe (33) for resting on the floor.

According to a feature of the invention, in order to improve the adhesion to the floor, the material and/or the tread pattern of the adhesion surface of the shoe (33) can be adapted depending on the nature of the floor on which the vehicle (2) is intended to be used.

As illustrated in FIGS. 2 to 8, the shoe (33) has a rounded shape, with an elongated surface of contact with the floor, tending towards linearity. Said contact surfaces of the shoes (33) are oriented in the same direction during the activated operation. The supporting feet (4) could of course have different shapes, for example circular, ovoidal, triangular, star-shaped, etc., resulting into modifying the surface of contact with the floor, according to the needs and namely the nature of the floors.

Figure 8:
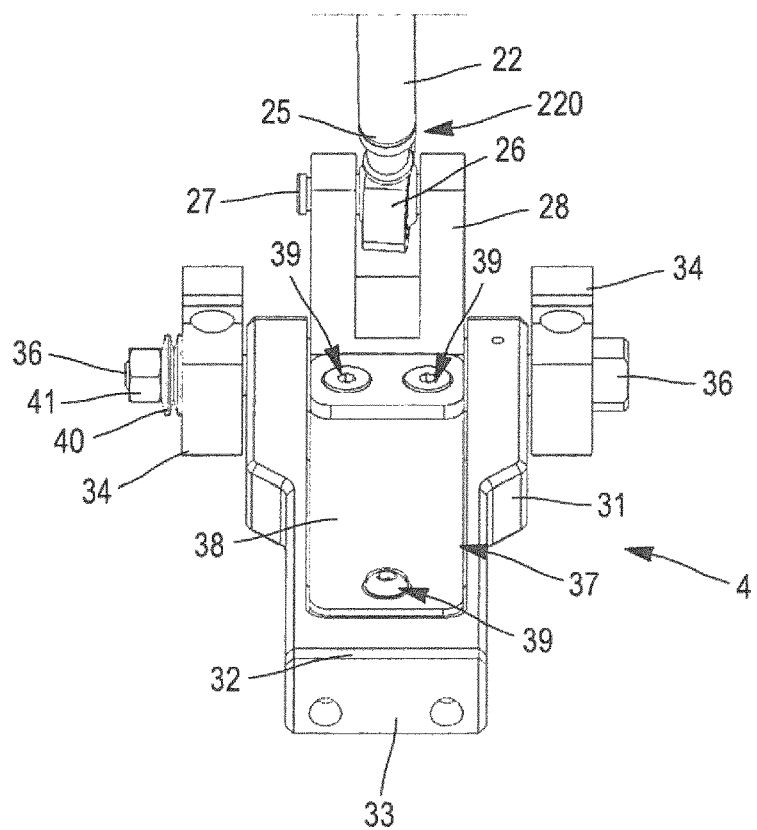
FIG. 8 is a representation in front view of a supporting foot connected to a linkage rod controlling its displacement.

According to an additional feature of the invention illustrated in FIG. 8, the angle transmission part (28) and the stirrup-shaped part (31) are mounted freely rotating about a shaft (36) pivoting in precision bearings (34) integral with a lower face (35) of the frame (8) of the vehicle (2). Preferably, these two bearings (34) are smooth bearings. Elastic means (37), which in practice include a stack of spring blades (38), connect, through at least one mechanical connecting means (39) (as for example a rivet or a screw), the stirrup-shaped part (31) and the angle transmission part (28). A resilient connection is therefore provided between said parts (28, 31). Thus, a possibility of elastic modulation, such as an absorption of forces for example due to the absence of planarity of the floor, is possible.

When the mechanical stabilization system (1) is activated, the supporting feet (4) are actuated in the contact position, the shoes (33) exerting an action on the floor permitting to immobilize the frame (8) of the vehicle (2) through mechanical friction against the floor. According to the desired thrust force, even the nature of the floors, the invention provides that the thickness and therefore the stiffness of the stack of spring blades (38) can be modulated: the greater it is, the greater is the thrust force and the grater is the relief of weight from the castors (3). This is the possibility of adjusting the relief of weight that was mentioned above.

The stack of spring blades (38) has, as also said, the advantage of permitting the mechanical system for stabilizing (1) the vehicle (2) to compensate for eventual defects in the flatness of the floor. More particularly, in the case of a localized elevation of the floor, the position of the supporting foot (4) implies a greater rotation and the stack of spring blades (36) absorbs this larger amplitude of rotation, which compensates for the elevation of the floor. Conversely, in the case of lowering of the floor, the stack of spring blades (27) urges the displacement of the stirrup-shaped part (31) until the shoe (33) enters into contact with the floor.

Advantageously and as illustrated in FIG. 8, a spring washer (40) is arranged between a bolt (41) located at the end of the shaft (36) and the bearing (34). This particular arrangement mechanically forces the shaft (36) with the bearings (34), which permits to compensate for the axial mechanical play at this level and to further improve the stabilization of the vehicle (2).

As shown in FIGS. 2 to 6, the supporting feet (4) are mounted on the frame (8) of the vehicle (2) so that on the same linkage (12) the distal foot (14) extends in front of the proximal foot (15). In fact, in the contact position, each supporting foot (4) exerts onto the floor an inclined action the horizontal component of which is in the direction opposite to that of at least another supporting foot (4), said horizontal component being oriented towards at least another supporting foot (4).

The invention claimed is:

1. A system for stabilization of a vehicle on a plurality of castors, the system including:
   a plurality of supporting feet configured to engage a floor, each foot of the plurality of feet movable between a retracted position, at a distance from the floor, and a contact position engaging the floor to immobilize the vehicle through mechanical friction against the floor;
   a control means for mechanically controlling said supporting feet, said control means being movable between two stable positions corresponding to the retracted position and the engaged position;

a transmission means for transmitting the displacement of the control means simultaneously to all the supporting feet;

wherein the plurality of supporting feet include a supporting foot adjacent to each castor of the plurality of castors, each supporting foot of the plurality of supporting feet including a structure that includes a connecting part connected to the transmission means and a supporting part adapted to be into contact with the floor, the supporting part being pivotally mounted on an individual shaft and provided with an elastic restoring means.

2. The system according to claim 1, wherein each supporting foot of the plurality of supporting feet exerts onto the floor an inclined action a horizontal component in a direction opposite that of an opposing supporting foot of the plurality of supporting feet, said horizontal component being oriented in the direction of a castor closest to each supporting foot.

3. The system according to claim 2, wherein said horizontal component is oriented towards at least another supporting foot.

4. The system according to claim 1, wherein each supporting foot of the plurality of supporting feet includes an elongated contact surface to contact the floor, wherein the elongated contact surface of each supporting foot extends linearly in a direction parallel to elongated contact surfaces on other supporting feet of the plurality of supporting feet.

5. The system according to claim 4, wherein the control means includes a pedal rotatable relative to a frame of the vehicle, the pedal actuating in rotation an axle equipped with cams, each cam connected to a linkage actuating at least one supporting foot of the plurality of supporting feet.

6. The system according to claim 5, wherein the axle actuated by the pedal is equipped with two cams arranged on either side of the pedal, each linkage controlling the movement of two supporting feet of the plurality of supporting feet.

7. The system according to claim 5, wherein the linkage includes a mechanical system for self-locking the pedal in a locked position and an unlocked position.

8. The system according to claim 5, wherein each cam actuates a connecting rod, the connecting rod coupling to a distal cam on a distal end of the connecting rod, the distal cam actuates in rotation a bracket pivoting relative to the frame of the vehicle to articulate one supporting foot of the plurality of supporting feet.

9. The system according to claim 8, wherein, when the pedal is close to a position corresponding to the engaged position, a vertical component of a force exerted by the connecting rod on the cam changes its direction, urging the pedal towards a locked position.

10. The system according to claim 8, wherein, when the pedal is close to a position corresponding to the retracted position, a jack connected to a first leg of at least one bracket exerts a force urging the system towards the retracted position.

11. The system according to claim 10, wherein the connecting rod is connected in rotation to the first leg of the bracket, a supporting foot of the plurality of supporting feet being connected to an opposing leg.

12. The system according to claim 11, wherein a linkage rod is hinged to the first leg of the bracket, the other end of said linkage rod being connected to an angle transmission part of an oppositing supporting foot.

13. The system according to claim 12, wherein the linkage rod includes two segments adjustable via at least one thread permitting to adjust transmission of the movement of the pedal to the plurality of supporting feet by modulating the length of said linkage rod.

14. The system according to claim 12, wherein each supporting foot of the plurality of supporting feet includes a connecting part formed by the angle transmission part connected to the bracket or the linkage rod and of a supporting part formed by a stirrup-shaped part including a free end provided with a shoe for resting on the floor, said parts being freely rotating about the individual shaft pivoting in bearings connected to the frame of the vehicle.

15. The system according to claim 14, wherein the elastic restoring means is formed of a stack of spring blades.

* * * * *